United States Patent [19]

Okubo

[11] 4,431,271
[45] Feb. 14, 1984

[54] DISPLAY DEVICE WITH A THIN FILM TRANSISTOR AND STORAGE CONDENSER

[75] Inventor: Yukitoshi Okubo, Yokohama, Japan

[73] Assignee: Canon Kabushiki Kaisha, Tokyo, Japan

[21] Appl. No.: 182,089

[22] Filed: Aug. 28, 1980

[30] Foreign Application Priority Data

Sep. 6, 1979 [JP] Japan .............................. 54-114423
Oct. 23, 1979 [JP] Japan .............................. 54-136725
Oct. 31, 1979 [JP] Japan .............................. 54-141869

[51] Int. Cl.³ .............................................. G02F 1/133
[52] U.S. Cl. ..................................... 350/334; 340/784;
357/23; 350/339 R; 350/333
[58] Field of Search ............... 350/334, 331, 333, 336,
350/339 R; 340/765, 784; 357/23 C, 23 TF, 31,
41, 45, 49, 2

[56] References Cited

U.S. PATENT DOCUMENTS

| | | | |
|---|---|---|---|
| 3,824,003 | 7/1974 | Koda et al. | 350/333 |
| 3,861,783 | 1/1975 | Dill et al. | 350/344 |
| 3,862,360 | 1/1975 | Dill et al. | 357/41 |
| 4,297,004 | 10/1981 | Nishmura et al. | 350/336 |

FOREIGN PATENT DOCUMENTS 2837433  8/1979  Fed. Rep. of Germany ...... 350/334

OTHER PUBLICATIONS

Fischer, A. G. "Flat TV Panels with Polycrystalline Layer"/*Microelectronic*, Jun. 1976, vol. 7, No. 4, pp. 5-15.
Hayama, H. et al., "Amorphous-Silicon Thin Film Metal-Oxide-Semiconductor Transistors" *Faculty Engineering* (Feb. 21, 1980) pp. 754-755.
Brody, T. P. et al., "A 6×6 Inch 20 Lines-Per-Inch Liquid Crystal Display Panel" IEE Transactions on Electron Devices, (Nov. 1973), vol. Ed-20, No. 11.

*Primary Examiner*—John K. Corbin
*Assistant Examiner*—David Lewis
*Attorney, Agent, or Firm*—Fitzpatrick, Cella, Harper & Scinto

[57] ABSTRACT

In an image display device an electrode of a storage condenser is composed of a drain electrode while the other electrode of said condenser is composed of a gate line of substantially the same width as that of said drain electrode and is provided across an insulating layer or of another conductive layer provided on a substrate across an insulating layer. The drain electrode constituting an electrode of the accumulating condenser may also be so positioned as to bridge two adjacent gate lines provided across an insulating layer and a semiconductor layer thereby forming the storage condenser.

21 Claims, 21 Drawing Figures

DISPLAY DEVICE WITH A THIN FILM TRANSISTOR AND STORAGE CONDENSER

BACKGROUND OF THE INVENTION

1. Field of the Invention

The present invention relates to an image display device for an electro-optical display, and more particularly to an improvement in a flat panel display device in which a semi-conductor drive array is integrated on the substrate constituting the display device.

2. Description of the Prior Art

In the field of image display devices, particularly those for electro-optical displays, there is already known a display device having a semi-conductor drive array as disclosed in the U.S. Pat. No. 3,824,003. In said device, as shown in FIG. 1 hereof, a substrate B is provided with gate lines $G_1$, $G_2$, ..., which are entirely covered in succession with an insulating layer I and a semi-conductor layer SC. Also there are provided source lines $S_1$, $S_2$, ... contacting with said semi-conductor layer SC so as to cross said gate lines $G_1$, $G_2$, ..., and further provided are drains $D_1$, $D_2$, $D_3$, $D_4$, ... constituting segment electrodes in the vicinity of the crossing points of said gate lines and source lines.

The above-mentioned semi-conductor SC is formed as a thin layer to constitute a semi-conductor drive array (switching element) as represented by thin film transistors (TFT).

A liquid crystal layer is formed between said substrate having the above-mentioned drive switching elements and a counter substrate having a counter electrode which is, for example, an electrode covering the entire surface, thus constituting an equivalent circuit shown in FIG. 2 hereof.

Said gate lines $G_1$, $G_2$, ... and source lines $S_1$, $S_2$, ... respectively receive scanning signals and signal voltages from suitable row generators ($R_1$, $R_2$, ..., $R_n$ and $P_1$, $P_2$, ... $P_n$) to perform (row-at-a-time) scanning.

$T_{11}$, $T_{12}$, $T_{21}$, $T_{22}$, ... are thin film transistors (TFT) constituted in the above-explained manner; $C_{11}$, $C_{12}$, $C_{21}$, $C_{22}$, ... are accumulating condensers formed between the gate lines and corresponding drains of said switching element array; and $LC_{11}$, $LC_{12}$, $LC_{21}$, $LC_{22}$, ... are condensers respectively containing liquid crystal layers and formed between said drains $D_1$, $D_2$, $D_3$, $D_4$, ... and the grounded counter electrodes (not shown).

Also IEEE Trans. on Electron Devices ED-20, p. 995 (1973) discloses a similar display device of which a part of the segment is shown in plan view in FIG. 3 hereof.

In said device a substrate, for example, made of glass is provided with plural gate lines $G_1$, $G_2$, ... on which is formed a semi-conductor SC separated by an insulating layer not shown. Said semi-conductor is in contact on an end thereof with a source line $S_1$ and on the other end thereof with a drain $D_1$ of the display segment. Under and facing said drain $D_1$ there is provided an electrode P connected to the gate line $G_1$ and adjacent to the gate line $G_2$ on which said semi-conductor SC is provided. The equivalent circuit of the above-explained structure is shown in FIG. 4, in which there are shown a thin film transistor $T_1$ constituted as shown in FIG. 3, a condenser $LC_1$ containing a liquid crystal layer and formed between said drain $D_1$ and a grounded counter electrode (not shown), and a storage condenser $C_1$ formed between the drain of said thin film transistor and the electrode P connected to the gate line $G_1$ adjacent to the gate line $G_2$ corresponding to said drain.

In the above-explained circuits the voltage of the course line is supplied to the drain to perform the display at the moment a signal is supplied to a selected gate, with a rise time constant determined by the product of the on-resistance of the semi-conductor and the capacitance (summed capacitances of the condenser containing the liquid crystal layer and the storage condenser).

Such display devices as explained in the foregoing are, however, characterized by certain drawbacks yet to be solved.

For example, in the display device shown in FIG. 1, as represented in the equivalent circuit of FIG. 2, the counter electrode of the storage condenser $C_{11}$ is constituted by an addressing gate line while the counter electrode of the liquid crystal-containing condenser $LC_{11}$ is grounded. This circuit is activated by rendering the transisor $T_{11}$ conductive by a voltage $V_1$ supplied to the row generator $R_1$, and a voltage $V_2$ is supplied to the column generator $P_1$ to charge the storage condenser with a differential voltage $|V_1-V_2|$. The storage condenser is generally designated with a capacity larger than that of the liquid crystal, and said differential charged voltage is retained within a time frame as the voltage applied to the liquid crystal when said voltage $V_1$ from the row generator $R_1$ is eliminated and the transistor $T_{11}$ becomes highly resistive. However, the capacity component of the liquid crystal is not negligible when the liquid crystal is made thinner and of a high dielectric constant in order to achieve a faster response. In such case, when $R_1$ returns to a low or grounded voltage, the charged voltages of the condenser $C_{11}$ and liquid crystal $LC_{11}$ are redistributed between the condensers so that the voltage actually applied to the liquid crystal layer is only determined in a complex manner. Also, as will be seen from FIG. 2, the storage condenser of which the counter electrode constitutes the gate line may receive a negative voltage upon opening of the gate even if the source voltage is at the ground potential. For these reasons there is necessitated a complex signal processing means such as for the addition of a bias or compensating voltage to the source signal in case the counter electrode of the storage condenser is composed of the addressing gate line. Also, another drawback of such display device lies in the difficulty of obtaining a transparent display since the semi-conductor employed in the structure is opaque or has a photoconductive property.

On the other hand, the display device shown in FIG. 3 is superior to the foregoing one in circuit function since, as shown in the equivalent circuit of FIG. 4, the signal voltage at $S_1$ is accumulated in the condenser $C_1$ if $G_1$ is grounded when $G_2$ is activated, and the determined voltage supplied to $S_1$ is given to the liquid crystal $LC_1$ after $G_2$ is turned off.

Also no functional error arises even when the capacity of the liquid crystal $LC_1$ is not negligible with respect to that of the condenser $C_1$, since both condensers have grounded counter electrodes.

However, the display device shown in FIG. 3 requires a more complicated structure, in the portion constituting the thin film transistor, than in the device shown in FIG. 1, thus resulting in a significant difference in the complexity of industrial production. Particularly in case small drains are to be arranged in a high density corresponding to the display pixels, the corresponding miniaturization of the transistors requires elevated pattern precision, thus unfavorably affecting the production yield, reliability, function stability, process time and cost. Also the gate lines, formed in narrow stripes, tend to form line defects and therefore require strenuous quality control in the production process. Furthermore, it is difficult to increase the effective display area since the display cannot be provided on the gate lines.

SUMMARY OF THE INVENTION

The first object of the present invention is to provide a novel drive switching element capable of eliminating both the defects associated with the drive switching element shown in FIG. 1 and those associated with the drive switching element shown in FIG. 3.

A second object of the present invention is to provide a display device avoiding the drawbacks in the equivalent circuit inherent in the drive switching element explained in relation to FIG. 1 and also the structural drawbacks of the drive switching element explained in relation to FIG. 3.

A third object of the present invention is to provide a display device having pixels arranged in a high density as a highly reliable and easily producible display panel.

A fourth object of the present invention is to provide a display device capable of showing stable and uniform image characteristics.

A fifth object of the present invention is to provide a flat panel display device of an easily observable image quality with good gradation and high contrast.

A sixth object of the present invention is to provide a display device capable of transmission or projection display regardless of the semiconductor material used and showing a satisfactory response.

A seventh object of the present invention is to provide a display device permitting increase of the effective display area of the drain electrodes constituting the display segments.

An eighth object of the present invention is to provide a display device not easily showing line defects in the gate lines that is easy to manufacture.

The foregoing objects of the present invention are achieved by a structure of the present invention in that an electrode of the storage condenser is composed of a drain electrode while the other electrode of said condenser is composed of a gate line of substantially the same width as that of said drain electrode and provided across an insulating layer or of another conductive layer provided on the substrate across an insulating layer, or in that the drain electrode constituting an electrode of the accumulating condenser is so positioned as to bridge two adjacent gate lines provided across an insulating layer and a semiconductor layer thereby forming the storage condenser.

According to one aspect of the present invention there is provided an image display device having a substrate provided with a drive switching element array having plural gate lines mutually separated and insulated, an insulating layer formed on said gate lines, semiconductor layers formed on said insulating layer, drains constituting display segments and plural source lines positioned to cross said gate lines, and another substrate having a counter electrode to perform display by an electro-optical change generated between said two substrates, wherein said semi-conductor layers are of a smaller area than that of said drains, and each of said gate lines has substantially the same width as that of the corresponding drain in the display face and constitutes a condenser with said drain.

According to another aspect of the present invention, there is provided an image display device having a first substrate provided with a drive switching element array and a second substrate provided with a counter electrode to perform display by an electro-optical change generated between said substrates, wherein said drive switching element array is provided on an insulating layer formed on a conductive layer overlying said first substrate.

According to a further aspect of the present invention, there is provided an image display device comprising a substrate provided with a drive switching element array having plural stripe-formed gate lines mutually separated and insulated, an insulating layer and a semiconductor layer provided in succession on said gate lines, plural source lines formed on said two layers so as to cross said gate lines and mutually separated plural drains positioned on said semi-conductor layer so as to be separated from said source lines and to be positioned to bridge two adjacent gate lines, and another substrate provided with a counter electrode, thereby being capable of performing display by an electro-optical change generated between said two substrates.

DETAILED DESCRIPTION OF THE PREFERRED EMBODIMENTS

Figure 6:
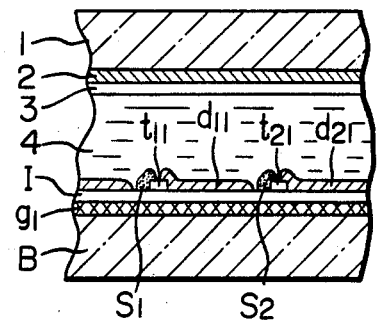
FIG. 6 is a cross-sectional view thereof.
Figure 5:
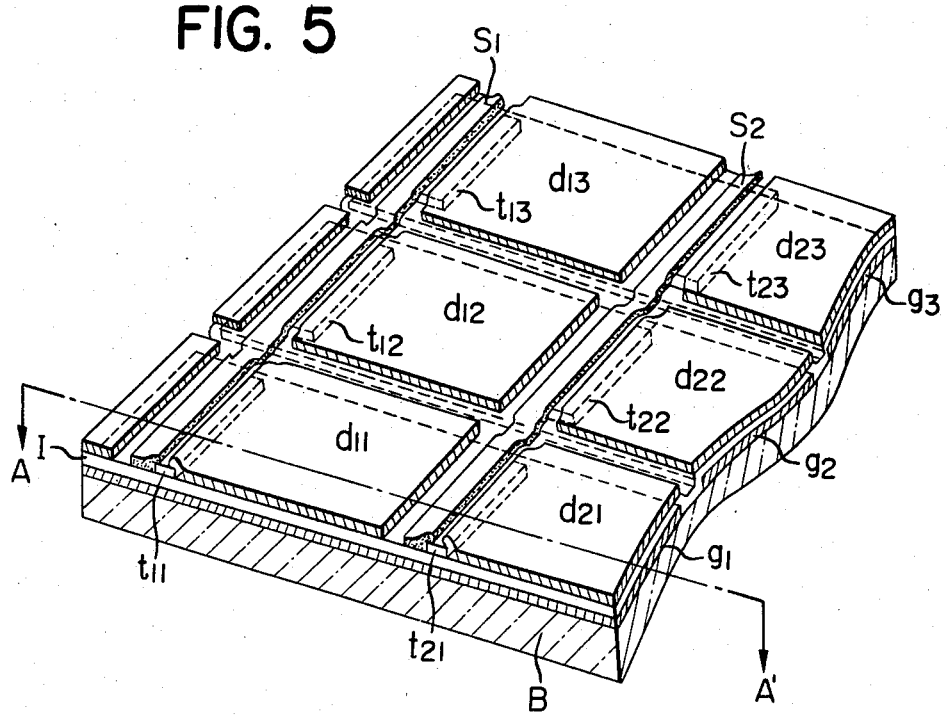
FIG. 5 is a perspective view showing the substrate of the display device of the present invention.

FIGS. 5 and 6 show an embodiment of the image display device provided with a semi-conductor drive array (drive switching array) of the present invention in which a liquid crystal layer is sandwiched between a substrate having a segment drain and a drive switching element of a smaller area, both provided at each apparent crossing point of plural gate lines and plural source lines provided on said substrate and another counter substrate, wherein said structure is featured in that the gate line has substantially the same width as the width of the display face of the corresponding drain to constitute a condenser with said drain.

In this manner, the use of a condenser composed of the gate line of the drive switching element and the corresponding drain of substantially the same width provides an improvement in the stability of performance, image contrast and production process. In addition, the use of a rectangular drive switching element elongated across the gate line reduces the on-resistance of the switching element, leading to other advantages such as faster charging to the storage condenser and the possibility of using a lower drive voltage.

Now the present invention will be explained in detail by the embodiments shown in the attached drawings.

FIG. 5 shows the substrate, having the drive switching element array, of the display device of the present invention in a perspective view, and FIG. 6 shows, in a magnified cross-sectional view, the display device composed with said substrate, wherein said substrate is sectioned along the line A-A' shown in FIG. 5. The substrate B having said drive switching element array is provided with gate lines $g_1$, $g_2$, $g_3$, . . . in a striped manner, which are covered with an insulating layer I. Above said gate lines and across said insulating layer I, there are provided semiconductors $t_{11}$, $t_{12}$, $t_{13}$, $t_{21}$, $t_{22}$, $t_{23}$, . . . at the same pitch as that of the segments to constitute drive switching elements. Source lines $S_1$, $S_2$, . . . are provided to cross said gate lines and in contact with an end of each of said semi-conductors, and also drains $d_{11}$, $d_{12}$, $d_{13}$, $d_{21}$, $d_{22}$, $d_{23}$, . . . are provided in contact with the other end of each of said semi-conductors.

Opposed to, and spaced by a spacer (not shown) from said drains, there is positioned a counter electrode substrate, for example, composed of a substrate 1 entirely covered with a conductive layer 2, that supports a liquid crystal layer 4 therebetween, thereby constituting the matrix display device. An additional insulating layer 3 may be provided if necessary.

FIGS. 7A to 7E schematically show the structure of the drive switching element array of the display device according to the present invention.

Figure 7A:
FIG. 7A is a plan view of gate lines provided on the substrate of the display device.

At first, FIG. 7A shows the gate lines of the display device. As illustrated, the substrate is substantially covered with a conductive layer divided by thin grooves to constitute plural gate lines $g_1$, $g_2$, $g_3$, . . . of a determined segment pitch.

Figure 7B:
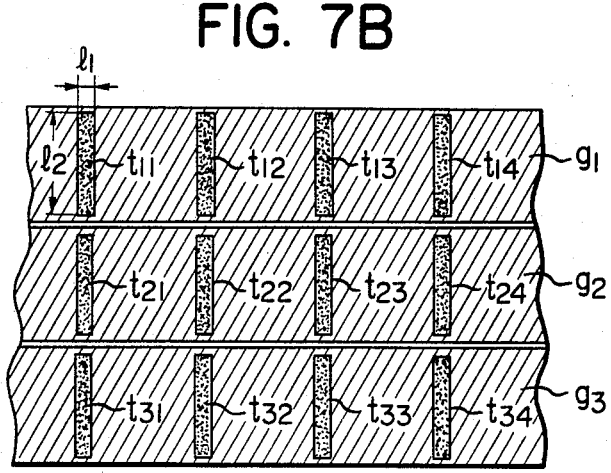
FIGS. 7B and 7C are plan views showing embodiments respectively of gate lines and thin film semi-conductors provided thereon.

Subsequently said gate lines are entirely covered with an insulating layer (not shown), on which are formed thin film semi-conductors $t_1$, . . . , $t_{34}$, . . . as shown in FIG. 7B with the same pitch along the gate lines as the pitch of the segments.

The effective display area can be enlarged in this manner by increasing the width of the gate lines and selecting each drain area to be substantially the same as each segment area apparently defined by each gate line and two source lines.

Figure 7C:
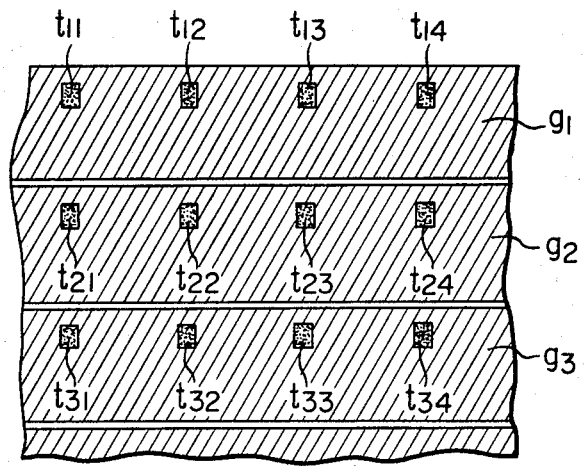

In the present invention the use of a large width of gate lines allows formation of said semi-conductors with a small length $l_1$ along the gate lines and a large length $l_2$ across the gate lines. It is however also possible to form the semi-conductors smaller than the width of the gate lines as shown in FIG. 7C.

Figure 7D:
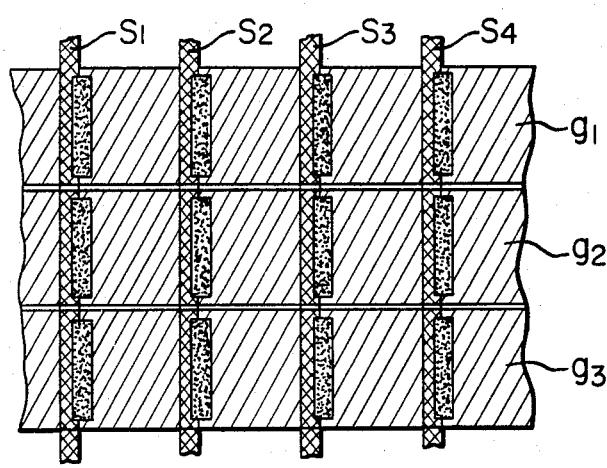
FIG. 7D is a plan view showing an embodiment in which source lines are provided respectively in contact with an end portion of thin film semi-conductors shown in FIG. 7B.
Figure 7E:
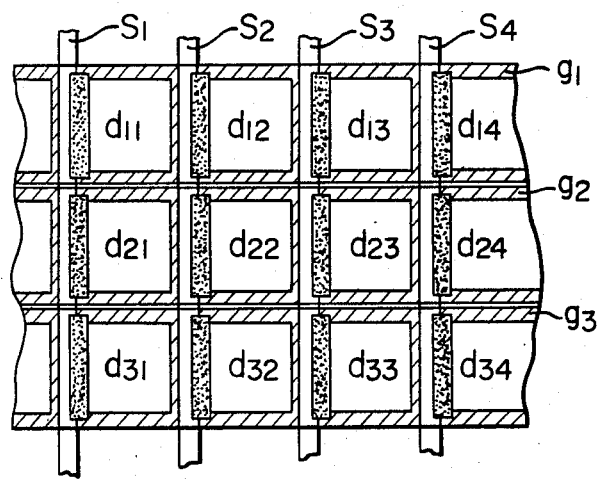
FIG. 7E is a plan view showing an embodiment in which drain electrodes are provided respectively at the other end portion of the semi-conductors.

As shown in FIG. 7D plural source lines $S_1$, $S_2$, $S_3$, $S_4$, . . . are provided in contact with an end of each of the semi-conductors shown in FIG. 7B, and, as shown in FIG. 7E, plural drains $d_{11}$, $d_{12}$, $d_{13}$, . . . $d_{33}$, $d_{34}$, . . . are provided in contact with the other end of each of said semi-conductors. The drains need not necessarily be shaped rectangularly as illustrated, but may also be shaped in circular, oval or polygonal form. Also in combination with the semi-conductors shown in FIG. 7C the source lines and drains can be formed in the above-explained manner.

The display device of the structure explained above shows improvements with respect to the production process, production yield, display legibility and driving stability.

More specifically, the use of wide gate lines, combined with a simplified structure, provides a larger tolerance in the positioning of semi-conductors, leading to the advantages of easier production, reduced line defects resulting from line breakage, and thus a significantly improved production yield.

Also the storage condenser formed between each gate line and the corresponding drain provides the advantages of a simplified structure, an enlarged effective display area of the drain constituting the display segment due to the absence of a gate line not contributing to the display, and sufficiently high capacity due to a large opposed area of the gate line and the drain and also due to the absence of another layer such as the semi-conductor therein.

Furthermore, the absence of the semi-conductor layer over a substantial portion of the gate lines permits use of this device as a transmission or projection display device.

Furthermore, the use of rectangular semi-conductors elongated across the gate lines allows reduction of the on-resistance of the switching elements, thus leading to the advantages of a reduced rise time-constant, the possibility of using a lower source voltage to be applied to the condenser or a shorter signal pulse to the gate lines allowing use of a larger number of segments.

For these reasons the display device of the present invention is advantageously employable for a display with a high segment density, particularly for the monitors for television or video camera requiring high-speed image display.

Figure 8:
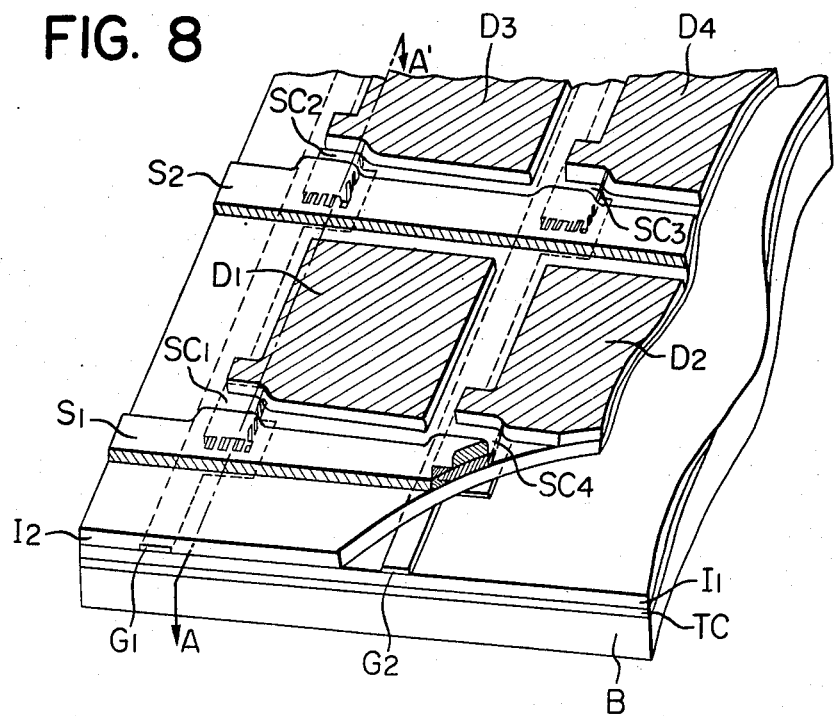
FIG. 8 is a perspective view of the substrate in another embodiment of the display device of the present invention.
Figure 9:
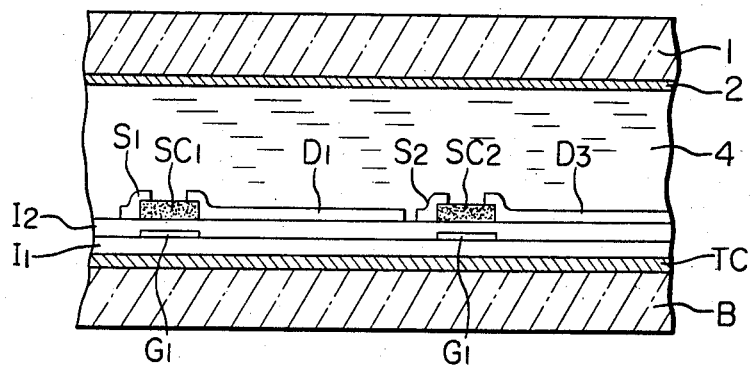
FIG. 9 is a cross-sectional view thereof.

FIGS. 8 and 9 show another embodiment of the image display device having drive switching elements of the present invention, which is provided with a first substrate having a thin film transistor array as the drive switching elements and a second substrate having a counter electrode to perform display by an electro-optical change generated between said substrates, wherein said thin film transistor array is provided over a conductive layer and across an insulating layer both formed on said first substrate.

Figure 10:
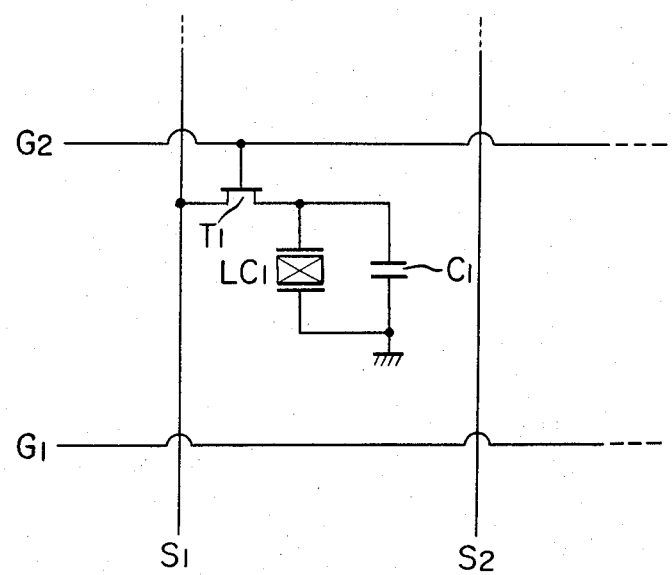
FIG. 10 is a diagram of the equivalent circuit thereof.

Now reference is made to FIG. 8 showing, in a schematic perspective view, a substrate having the drive switching element array of the present invention, wherein the substrate B, for example, formed of a glass plate is entirely covered with a conductive layer TC, which is in turn covered with an insulating layer $I_1$. According to the present invention, the above-mentioned substrate is provided thereon with an ordinary thin film transistor array. On said insulating layer $I_1$ there are provided gate lines $G_1$, $G_2$, ... in such patterns as to extend under the semi-conductors to be formed in superposition thereafter. Said gate lines $G_1$, $G_2$, ... are entirely covered with another insulating layer $I_2$, on which and corresponding to said gate lines formed are thin film semi-conductors $SC_1$, $SC_2$, $SC_3$, $SC_4$, ... in the illustrated manner. Source lines $S_1$, $S_2$, ... are provided orthogonally crossing said gate lines and in contact with an end of each of said semi-conductors, and drains $D_1$, $D_2$, $D_3$, $D_4$, ... are further provided in contact with the other end of each of said semi-conductors. Each of said drains functions as an electrode of the storage condenser and also as a segment electrode for image display. FIG. 9 shows, in a partial cross-sectional view, the structure of the display device in which an electro-optical effect material is sandwiched between the above-mentioned substrate having the drive switching element array and another substrate having a counter electrode, wherein the lower substrate is sectioned along the line A-A' in FIG. 8. In FIG. 9 the components corresponding to those shown in FIG. 8 are represented by corresponding numbers and are omitted from the following explanation. The upper substrate 1 is provided on one face thereof with a thin film electrode 2, and said substrates B and 1 are maintained at a determined spacing by an unrepresented spacer to maintain an electro-optical effect material 4 therebetween and are circumferentially sealed to obtain the display device shown in FIG. 9. FIG. 10 shows the equivalent circuit for one pixel of such display device, wherein source lines $S_1$, $S_2$, ... and gate lines $G_1$, $G_2$, ... are the same as those shown in FIG. 8. $LC_1$ represents a display pixel composed of the drain $D_1$ and counter electrode 2 to maintain the electro-optical effect material 4 therebetween. A storage condenser $C_1$ is formed by the drain $D_1$ and the electrode TC specific to the present invention, which are provided across the insulating layer $I_1$. Also $T_1$ is a MOS transistor composed of the source $S_1$ and the drain $D_1$ forming ohmic contacts at a determined gap with a semiconductor $SC_1$ formed above the gate portion of $G_1$ and across an insulating layer $I_2$.

Figure 4:
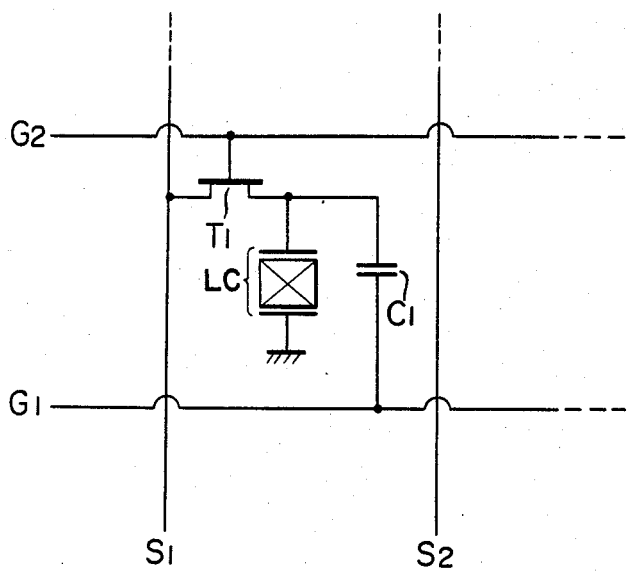
FIG. 4 is a diagram of the equivalent circuit thereof.

The foregoing embodiment of the present invention is featured in that the condenser $C_1$ can be constantly grounded at the counter electrode to easily achieve a function similar to that explained in relation to the equivalent circuit in FIG. 4, and that the separate structure of the gate line and the counter electrode of the storage condenser eliminates the patterning step of said counter electrode and allows the use of different materials for these components, thus adding freedom in the designing of a transmission type display device, for example, employing a highly conductive metal for reducing the resistance of a fine-sized gate line(s) and a transparent conductor for the conductive layer TC. Also such structure is effective in preventing the photo-conductive effect on the semi-conductors $SC_1$, $SC_2$, $SC_3$, $SC_4$, ... by the light entering through the lower substrate B as the metal gates are provided under said semi-conductors.

However, the advantage of the present invention is not limited to the transmission type structure. Also, in the reflection type display device, the use of a conductive layer TC, in the gap between the drains constituting the pixels and the source lines, made of a material the same as the reflective metal constituting said drains provides a display face uniform in apparent reflectivity and also also characterized by the aforementioned functional advantages with an easily producible structure. Also, the aforementioned shielding effect against the light entering through the lower substrate B can further be enhanced in the case of the reflecting display device more than in the case of a transparent type. Furthermore, the foregoing embodiment shown in FIG. 9 provides another advantage, both in the reflection and transmission display devices, that the conductive layer 2 entirely covering the upper substrate 1 and another conductive layer TC provided between the lower substrate B and the circuit layer are provided, when both grounded as shown in FIG. 10, a shielding effect to protect the thin film transistor array form the external electric field, thus facilitating the stable function of MOS transistors. It is also possible to supply said conductive layers TC and/or 2, which are electrically independent in the foregoing embodiment, with desired bias voltage or voltages.

As explained in the foregoing, the present invention provides the advantages in the production technology of display devices and the advantages in the functional drive thereof, and the display device thus obtained is advantageous in drive performance, productivity and reliability and is most adapted as a small display with pixels arranged in high density, for example, for television or a monitor for a video camera.

Figure 11:
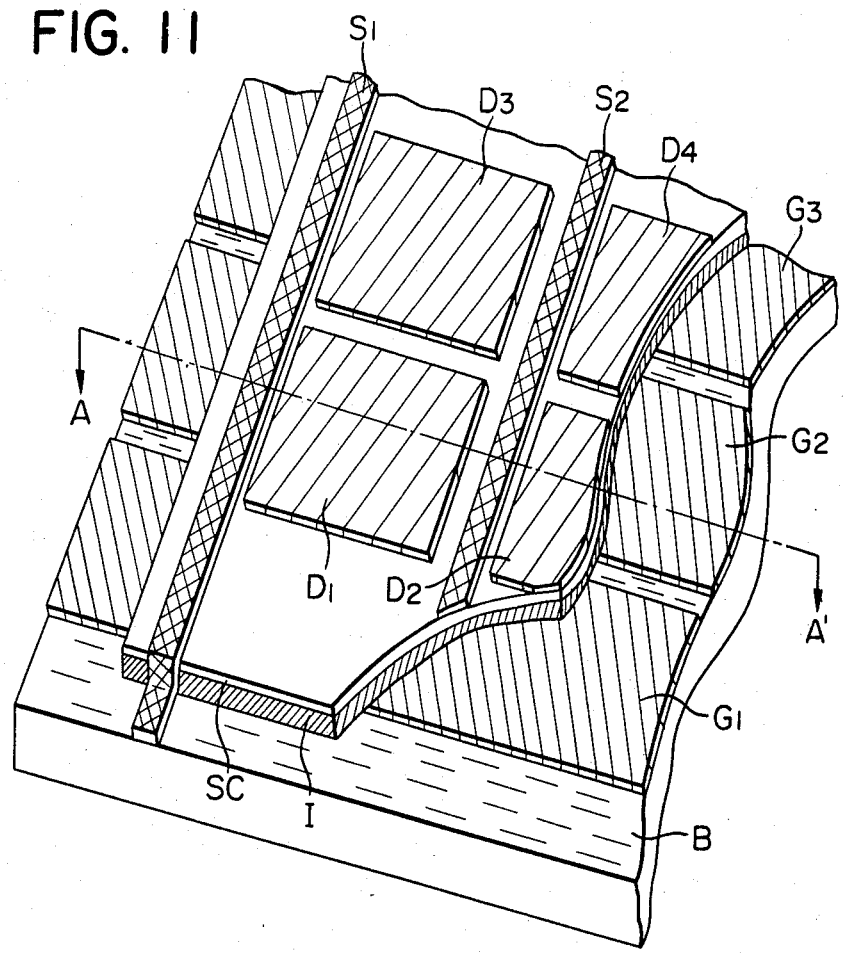
FIG. 11 is a perspective view of the substrate in still another embodiment of the display device of the present invention.
Figure 12:
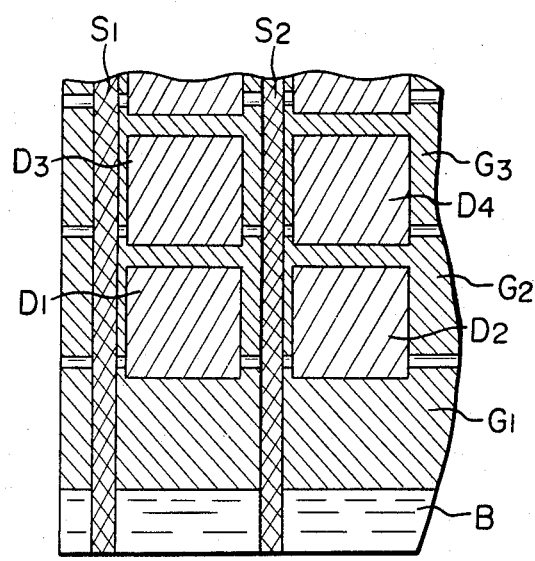
FIG. 12 is a plan view thereof.
Figure 14:
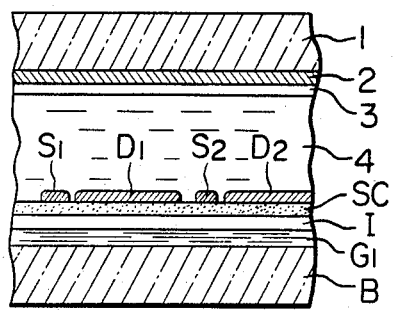
FIG. 14 is a cross-sectional view thereof.

FIGS. 11, 12 and 14 show still another embodiment of the image display device having drive switching elements of the present invention, wherein said display device comprises a substrate having mutually separated plural gate lines in stripe form, an insulating layer and a thin film semi-conductor layer superposed in succession on said gate lines, plural source lines provided on said two layers so as to cross said gate lines and mutually separated plural drains provided on said thin film semi-conductor layer so as to be separated from said source lines and so as to bridge two adjacent gate lines thereby constituting a thin film transistor array, and another substrate having a counter electrode, thus performing display by an electro-optical change generated between said two substrates.

Figure 1:
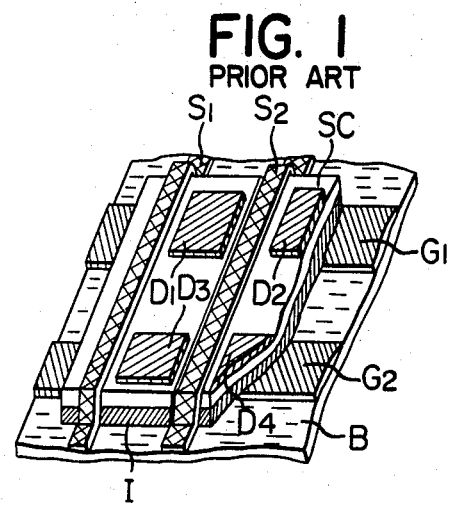
FIG. 1 is a perspective view of the substrate provided with a conventional semi-conductor drive array.

The display device of such structure has the advantage in production technology as explained in relation to the structure shown in FIG. 1 and also the advantage in drive performance as explained in relation to the equivalent circuit shown in FIG. 4.

Now referring to FIG. 11 showing the substrate having the drive switching element array of the present invention in a perspective view, a substrate B made for example of glass is provided thereon with strip formed gate lines $G_1$, $G_2$, $G_3$, ... mutually separated by thin gaps required for mutual insulation. An insulating layer I and a semi-conductor layer SC are formed thereon in succession. In contact with said semi-conductors SC and crossing said gate lines there are provided source lines $S_1$, $S_2$, ... in a narrow stripe form. In addition drains $D_1$, $D_2$, $D_3$, $D_4$, ... are provided at substantially the same pitch as that of the gate lines so as to be in contact with said semi-conductors SC and to respectively bridge two adjacent gate lines, while maintaining a determined gap to said source lines.

Figure 13:
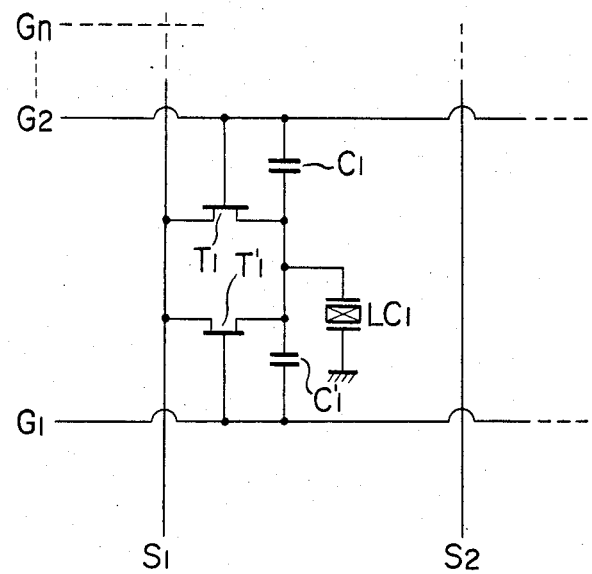
FIG. 13 is a diagram of the equivalent circuit thereof.

FIG. 12 is a schematic plan view showing the relation between the gate lines and the drains on the substrate shown in FIG. 11, wherein the insulating and semi-conductor layers present under the source lines $S_1, S_2, \ldots$ and the drains $D_1, D_2, D_3, D_4, \ldots$ are omitted for simplicity. Also FIG. 13 shows the equivalent circuit for one pixel when the drive switching element array shown in FIGS. 11 and 12 is employed to constitute the display device, wherein $C_1$ is a storage condenser formed by the gate line $G_2$ and the drain $D_1$, opposed thereto across said insulating and semi-conductor layers (not shown), corresponding to a pixel; $C_1'$ is a capacitor formed by a part of the drain $D_1$ and the gate line $G_1$; $T_1$ is a MOS FET formed on the gate line $G_2$ by the gap of the source $S_1$ and the drain $D_1$ on the unrepresented semi-conductor layer; $T_1'$ is similarly a MOS FET formed on the gate line $G_1$ by the gap between the source $S_1$ and the drain $D_1$; and $LC_1$ is a liquid crystal display pixel or element formed by a liquid crystal material sandwiched between the drain $D_1$ and the counter electrode.

FIG. 14 is a schematic cross-sectional view of the display device sectioned in a position corresponding to the line A—A' in FIG. 11, wherein 1 is an upper substrate provided on one face thereof with a conductive layer 2 which may eventually be covered by an insulating layer 3 if necessary. 4 is a liquid crystal layer maintained in position by space elements (not shown) and by a hermetic seal (not shown) along the periphery of the display device. The thin film transistor matrix array provided on a lower substrate B is represented by numbers corresponding to those in FIG. 11. In the present embodiment the display is rendered visible in suitable combination with polarizing filters, ¼-wavelength plates, color filters, light diffusing plates, reflecting plates etc. according to the electro-optical functional mode of the device.

The above-explained embodiment is characterized in that the storage condenser $C_1$ can be operated with the grounded counter electrode to easily achieve a function similar to that explained in relation to the equivalent circuit of FIG. 4, and in that the advantage in production technology explained in relation to FIG. 1 is obtained.

In the following the advantage in the production technology will be further specified in comparison with the structure shown in FIG. 3. The structure shown in FIG. 11 offers wider alternatives in the production process since the gate lines $G_1, G_2, G_3, \ldots$ on the substrate are made into stripe forms mutually separated by minimum necessary gaps required for mutual insulation, thus enabling free selection of the fabricating process and facilitating achievement of a high precision even for minute patterns, for example, with photoetching. On the other hand, the structure shown in FIG. 3, involving line-form patterns finer than the pixels, requires a higher precision than in the structure of FIG. 11, or often results in, in case of the same working precision, functional defects due to line breakages or a higher resistance resulting from line thinning, thus deteriorating the functional reliability. In contrast, the structure shown in FIG. 11 allows the use of thicker gate lines, thus avoiding the defects resulting from line breakage. In addition, the structure of FIG. 3 is characterized by the loss in effective display area since the display area is lost in the portion where the gate lines are extended.

Figure 3:
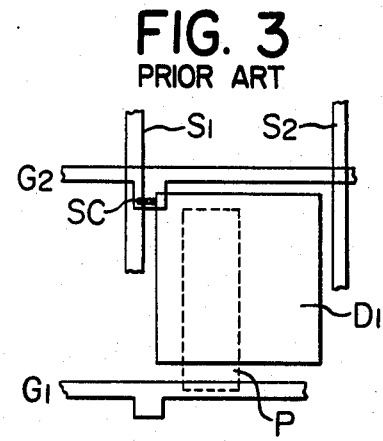
FIG. 3 is a plan view of a conventional semi-conductor drive array.

Although the structure of FIG. 11 and that of FIG. 3 are substantially equivalent with respect to the formation of the insulating layer I, they are significantly different with respect to the formation of succeeding semi-conductor layer SC. While the structure of FIG. 3 requires not only the pattern precision but also the precision of alignment with the gate portions of gate lines existing thereunder, the structure of FIG. 11 does not require the patterning step, thus being advantageous in production yield, reliability and process time. The precision requirement for the source electrodes is substantially the same in both structures, but the structure of FIG. 11 does not require the precision for alignment. Also the drains require alignment in both structures, but with a stricter precision in the structure of FIG. 3. The source and drain, forming ohmic contacts with the semi-conductor, can be prepared easier if they are made of the same material, particularly in the case of the reflection display device.

In such case, if these components are to be formed by photoetching from a uniform metal layer, the structure of FIG. 3 requires exact positioning both in x and y directions, in addition to a sufficiently high pattern precision. On the other hand, the structure of FIG. 11 does not require a high positional precision in the x-direction (along the gate lines) and requires a lower precision in the y-direction than in the structure of FIG. 3.

Furthermore, the structure shown in FIG. 3 will become totally inoperative in case the drain is not in contact with the semi-conductor.

From the foregoing explanation it will be understood that the structure of the present invention is superior in terms of production factors to the structure shown in FIG. 3, but the former is also superior to the structure shown in FIG. 1 in that said structure requires the positional precision in the y-direction along the sources since the drains $D_1, D_2, D_3, \ldots$ have to be positioned on the gate lines $G_1, G_2, \ldots$ while the structure of FIG. 11 only requires a reduced precision since the drain, for example $D_3$, needs to bridge two adjacent gate lines, for example $G_2$ and $G_3$. Also the structure of FIG. 11 is advantageous in the effective display area since the use of gate lines, mutually separated by minimum necessary gaps for insulation, allows use of sufficiently large drains constituting the display pixels. Furthermore, the light shielding effect to the semi-conductors can be enhanced if these components are made of an opaque material. However the advantage of the structure of the present invention is more conspicuous in the drive functions, as will be explained in the following in comparison with the equivalent circuit shown in FIG. 2.

Figure 2:
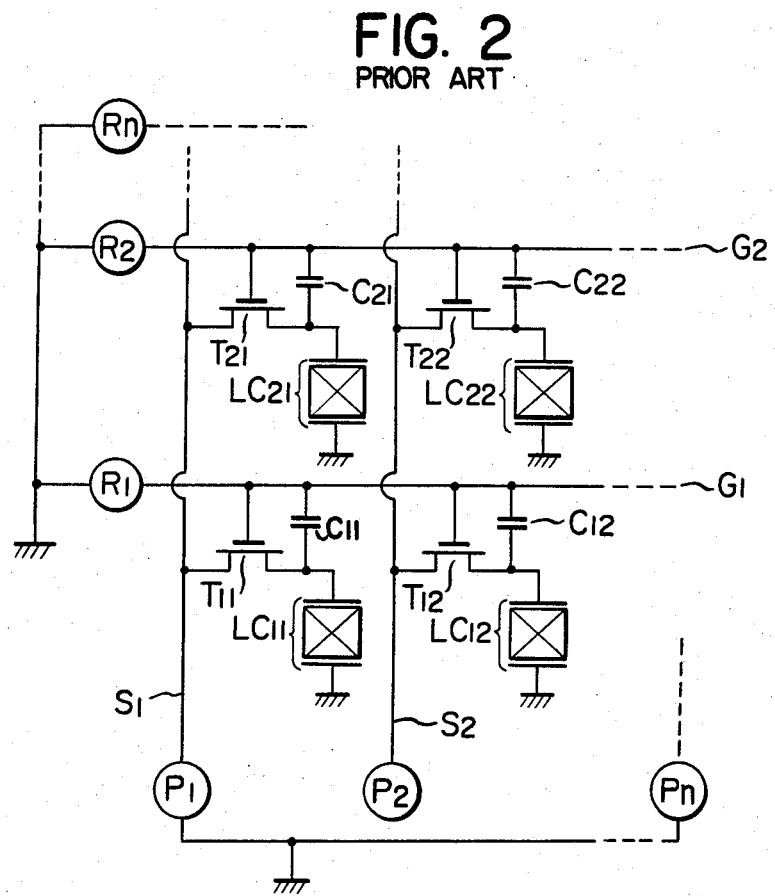
FIG. 2 is a diagram of the equivalent circuit thereof.

The display function in each of FIGS. 2 and 13 is achieved by row-at-a-time scanning, in which, for example in FIG. 2, a voltage $V_1$ is supplied as the on-signal to row generator $R_2$ to shift all the transistors $T_{21}, T_{22}, \ldots$ in this row to conductive state, while an off-signal for example of ground level is supplied to all other rows $R_1, R_3, \ldots$ to maintain all the transistors in said rows in non-conductive state. In this state the display signals corresponding to said row $R_2$ are supplied to the columns $P_1, P_2, P_3, \ldots$. For example, a voltage $V_2$ is supplied to the column $P_1$ to charge the storage condenser $C_{21}$ through the transistor $T_{21}$ with a voltage $|V_1-V_2|$. In case $LC_{21}$ is negligibly small with respect to $C_{21}$, the charge accumulated in said condenser $C_{21}$ supplies a voltage to $LC_{21}$ when the signal to the row $R_2$ is turnd off. However, if the voltages $V_1$ and $V_2$ are mutually close or equal, an effective charging cannot be expected because of the reduced charging voltage. Also in case the capacity of the liquid crystal is not negligible, the storage condenser and the liquid crystal element will have different charged voltages since the counter electrodes thereof are at $V_1$ and ground potential, respectively, and there will result the redistribution of the voltages after the signal to the row $R_2$ is turned off. For this reason, in order to supply a desired voltage within a time frame, it becomes necessary to provide a compensating bias in consideration of the gate voltage $V_1$ for the condenser $C_{21}$ and of the capacity ratio of $C_{21}$ and $LC_{21}$, thus leading to the drawbacks of having to use different voltages $V_1$ and $V_2$ to supply a bias signal to source lines even when the display signals are not existent, and to use a complicated circuitry for compensation. In addition, in case the capacity of the liquid crystal is not negligible, the possible fluctuation in the capacity ratio of the accumulating condenser and liquid crystal element may render such compensation totally impossible. The structure of the present invention is advantageous in avoiding such drawbacks. In the course of successive row-at-a-time scanning from Gn in the structure shown in FIG. 13, and in response to the signal to $G_2$, the signal $V_2(N-1)$ for the previous row is introduced to $C_1$ and $LC_1$ through transistor $T_1$, which signal however is immediately replaced by the signal $V_2(N)$ to be accumulated in response to $G_1$-on and $G_2$-off. At this point the on-signal $V_1$ is supplied to the row $G_1$, and, if the row $G_2$ is at the ground potential, the write-in signal $V_2(N)$ supplied to the source $S_1$ is equally supplied to $C_1$ and $LC_1$ through transistor $T_1'$, said voltage being maintained in $LC_1$ during the time frame when the rows $G_1$ and $G_2$ are grounded.

The use of the structure as shown in FIG. 12 for the drive switching element array allows increase of the areas of $G_2$ and $D_1$ constituting the condenser $C_1$ in comparison with the area of the condenser $C_1'$, whereby the condenser $C_1$ functions substantially as the storage condenser. The circuit functions as if the transistor $T_1$ is not existent when the row $G_2$ is at the ground level, and it will be understood that the circuit in FIG. 13 is equivalent to that of FIG. 4 if $T_1$ and $C_1'$ do not exist. Such structure is insensitive to the eventual fluctuation in the capacity ratio of $C_1$ and $LC_1$, and performs effective signal write-in even when the voltage of the no-signal for the gate line $G_1$ and that of the write-in signal for the column line $S_1$ are mutually close or identical. Although the foregoing explanation does not cover the signals entered during the scanning of the preceding row, such unnecessary signals are practically negligible for a sufficiently large number n of the scanning lines because such unnecessary write-in signals are entered only during 1/n of the frame time. In this sense the transistor $T_1$ may seem rather unnecessary, but the present invention is further featured in effective utilization of said transistor.

First, in case the voltage of the gate signal $V_1$ is close to or the same as that of the source signal $V_1'$ and the capacity of $LC_1$ is negligibly small with respect to that of $C_1$, the scanning of the preceding row functions to cancel the voltage maintained in $LC_1$ during the frame time, through discharging of the condenser $C_1$ caused by the small or equal potential difference between both electrodes when said transistor $T_1$ is conductive. This function is particularly useful in signal processing in TTL level, for example, binary level display of characters.

Secondly, in case the source signal $V_2$ is sufficiently different from the gate signal V, the signals entered by the scanning of the preceding row function as preliminary signals for the scanning signals $G_1$, thus accelerating the signal rise. Such drive method is useful as a bias in luminance modulation of the displayed image, and is particularly effective in image display involving gradation.

As explained in detail in the foregoing, the present invention provides the advantages both in the production factor and in the drive performance.

Naturally the present invention is not limited to the foregoing embodiments, but is subject to various modifications within the scope of the present invention. For example, the drive switching element array may be modified as shown below.

Figure 15:
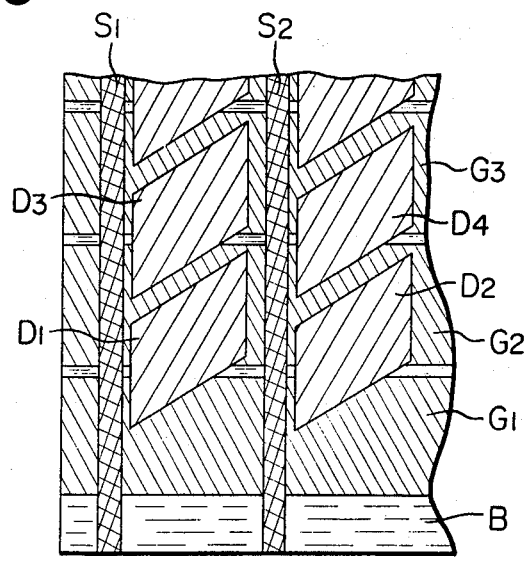
FIGS. 15 and 16 are cross-sectional views showing the substrates of still other embodiments of the display device of the present invention.

FIG. 15 shows a modification in which the drains are shaped as rhombic forms to further reduce the capacity $C_1'$ shown in FIG. 13, thus reducing the on-off resistance of the transistor $T_1'$.

It will also be easily understood from FIGS. 12 and 15 that the capacity ratio of $C_1'$ and $C_1$ can be arbitrarily selected by the coverage ratio over two gate lines.

Figure 16:
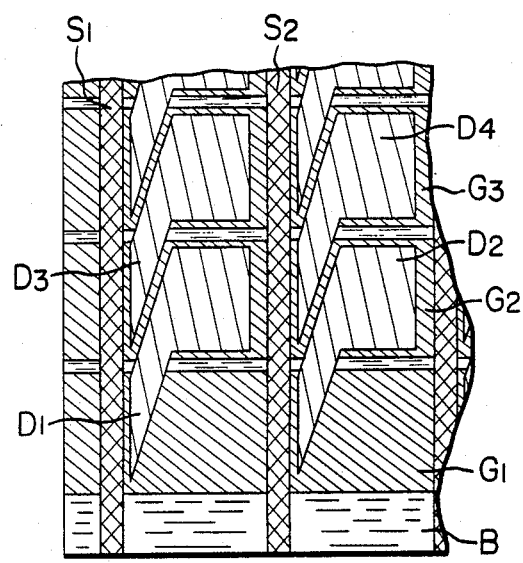
Figure 17:
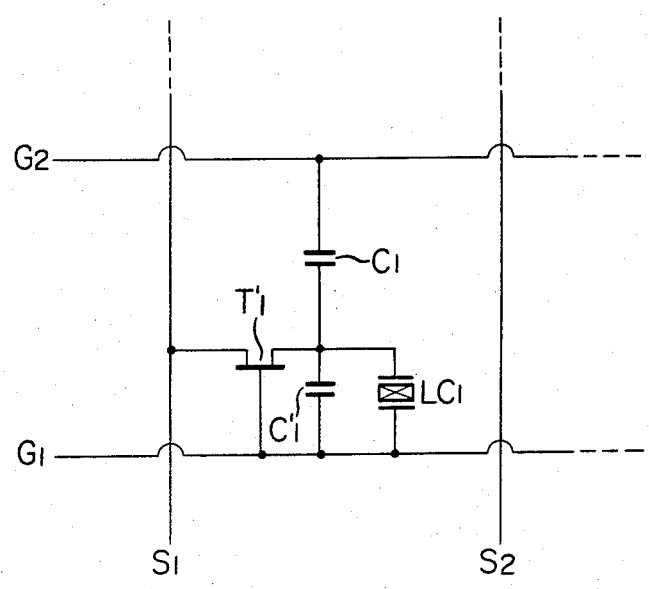
FIG. 17 is a diagram of the equivalent circuit of the display device shown in FIG. 16.

FIG. 16 shows another modification in which the spirit of the present invention is further accentuated, whereby the circuit lacks the thin film transistor $T_1$ and thus more resembles the circuit shown in FIG. 4. FIG. 17 shows the equivalent circuit, which will not however be explained further because of its similarity to the circuits described in the foregoing explanation.

Although the foregoing explanation has been limited to the liquid crystal display elements, this is just for the purpose of simplicity and the present invention is by no means limited to such display elements.

As will be evident from the foregoing explanation, the display device of the present invention is also satisfactorily applicable to other embodiments performing display by other electro-optical changes such as electrochromy or electroluminescence.

The display device of the present invention constructed as explained in the foregoing is characterized by satisfactory productivity, reliability and performance, is suitable both for binary level display and for display with gradation, and is advantageously usable as a small display device with high-density pixels, for example for television display or as the monitor for video cameras.

The substrates 1 and B employed in the present invention are generally made of glass, but in case of a reflection type display device one of said substrates may be composed of an opaque material such as metal or ceramic material. Conductive components constituting the gate ines, source lines, drains and counter electrode may be composed of conductive transparent oxides such as $In_2O_3$ or $SnO_2$, or, in case transparency is not required, metals such as Al, Ag, Pt, Pd, Cr, Ni etc. The conductive layer TC shown in FIGS. 8 and 9 may be composed of a thin film of transparent conductive inorganic oxides such as $In_2O_3$ or $SnO_2$ in case the transparency is required, or, if such transparency is not necessary, there may be used a thin film made of metal or alloy composed of Al, Ag, Pd, Pt, Cr, Ni, Mo, Si etc.

Also the insulating layer can be selected suitably from metal oxides such as $SiO$, $SiO_2$, $TiO_2$, $ZrO_2$, $Al_2O_3$ or $CeO_2$, halides such as $MgF_2$ or $CaF_2$, or silicon nitride. The thin film semi-conductor may be selected from CdS, CdSe, Se, Te or amorphous silicon.

The liquid crystal material can be nematic, cholesteric, smectic or mixtures thereof according to the display function mode to be selected.

The display function mode can be so-called TN, DAP, DSM, HAN, guest-host or phase transfer type, and suitable molecular orientation and optical detection means (¼ wavelength plate, polarizer, reflector etc.) can be selected accordingly.

In the display device of the present invention it is furthermore possible to provide a protective insulating layer on the drive switching element array for improving the operational stability or color filter corresponding to the display segment for colored display.

What I claim is:

1. A display device comprising a first substrate provided with an array of drive switching elements, said array including a plurality of gate lines mutually separated and mutually insulated, an insulating layer formed on said gate lines, semi-conductor layers formed on said insulating layer, a plurality of drains constituting display segments and each overlying at least one said gate line with at least said insulating layer being positioned therebetween, and a plurality of source lines positioned to cross said gate lines and each connected through at least one semiconductor layer to at least one drain, and another substrate mounted in opposition to said array on said first substrate having a counter electrode whereby display by an electro-optical change generated between said two substrates may be performed, and wherein each said semi-conductor layer is of a smaller area than that of one of said drains, and each of said gate lines has substantially the same width as that of an overlying drain, each said gate line and one overlying drain thereby constituting a condenser.

2. A display device according to claim 1, wherein each said drive switching element is composed of a thin film transistor.

3. A display device according to the claim 2, wherein each said semi-conductor layer constitutes a portion of one said thin film transistor and is composed of amorphous silicon.

4. A display device according to claim 1, wherein each said drive switching element has a rectangular form elongated in a direction across said gate lines.

5. A display device according to claim 1, wherein said semi-conductor layers are formed over said gate lines and across said insulating layer, with the same pitch as that of the display segments.

6. A display device according to claim 1, wherein a liquid crystal layer is sandwiched between said two substrates.

7. A display device comprising a first substrate provided with a drive switching element array, including a plurality of gate lines mutually separated and mutually insulated, a plurality of semi-conductor layers, a first insulating layer interposed between said gate lines and said semi-conductor layers, a plurality of drains constituting display segments each in contact with one of said semi-conductor layers, and a plurality of source lines also insulated from said gate lines by said first insulating layer, positioned to cross said gate lines, and each in contact with at least one semi-conductor layer; a conductive film interposed between said first substrate and said drains and opposed to said drains; a second insulating layer interposed between said conductive film and said gate lines and between said conductive film and said drains; and a second substrate mounted in opposition to said array on said first substrate and provided with a counter electrode whereby display by an electro-optical change generated between said substrates may be performed, and whereby a capacitance is formed between said conductive film and said drains.

8. A display device according to claim 7, wherein said drive switching element array is composed of a thin film transistor array.

9. A display device according to claim 8, wherein each said semi-conductor layer constitutes a portion of one of said thin film transistors and is made of amorphous silicon.

10. A display device according to claim 7, wherein said conductive layer formed on said first substate is a transparent conductive layer.

11. A display device according to claim 10, wherein said transparent conductive layer formed on said first substrate is a layer of $In_2O_3$ or $SnO_2$.

12. A display device according to claim 7, wherein said conductive layer formed on said first substrate is an opaque conductive layer.

13. A display device according to claim 12, wherein said opaque conductive layer is formed of a metal or an alloy of metals selected from the group consisting of Al, Ag, Pd, Pt, Cr, Ni, Mo and Si.

14. A display device according to claim 7, wherein said second insulating layer formed on said conductive layer overlying said first substrate is composed of at least a compound selected from the group consisting of SiO, $SiO_2$, $TiO_2$, $ZrO_2$, $Al_2O_3$, $CeO_2$, $MgF_2$, $CaF_2$ and $Si_3N_4$.

15. A display device according to claim 7, wherein a liquid crystal layer is sandwiched between said two substrates.

16. A display device comprising a first substrate provided with a drive switching element array including plural stripe-formed gate lines mutually separated and mutually insulated, an insulating layer and a semi-conductor layer provided in succession on said gate lines, plural source lines formed on said two layers so as to cross said gate lines, and mutually separated plural drains positioned on said semiconductor layer so as to be separated from said source lines and to be positioned to overlie and to bridge two adjacent gate lines, and another substrate mounted in opposition to said array on said first substrate and provided with a counter electrode, whereby display by an electro-optical change generated between two substrates may be performed.

17. A display device according to claim 16, wherein each drive switching element in said array is composed of a thin film transistor.

18. A display device according to claim 17, wherein said semi-conductor layer constitutes a portion of each of said thin film transistors and is made of amorphous silicon.

19. A display device according to claim 16, wherein each of said drains has a non-rectangular shape in plan view to overlie and to bridge two adjacent gate lines as aforesaid.

20. A display device according to claim 16, wherein a liquid crystal layer is sandwiched between said two substrates.

21. A display device including a first substrate; a conductive layer formed on said first substrate; a first insulating layer formed on said conductive layer; a drive switching element array provided on said first insulating layer, comprising an array of thin film transistors including a plurality of gate lines mutually separated and mutually insulated, a second insulating layer formed on said gate lines, a plurality of semi-conductor layers each constituting a portion of one of said thin film transistors, being made of amorphous silicon, and being formed on said second insulating layer, a plurality of drains constituting display segments also formed on said second insulating layer, and a plurality of source lines formed on said second insulating layer positioned to cross said gate lines and each connected through at least one semi-conductor layer to at least one drain; and a second substrate mounted in opposition to said array on said first substrate and provided with a counter electrode whereby display by an electro-optical change generated between said substrates may be performed.

* * * * *